United States Patent
Prescott et al.

(10) Patent No.: US 9,719,610 B2
(45) Date of Patent: Aug. 1, 2017

(54) METHOD FOR DETECTING AN OPERATING CONDITION ON A VALVE ASSEMBLY AND IMPLEMENTATION THEREOF

(71) Applicant: Dresser, Inc., Addison, TX (US)

(72) Inventors: Robert Claude Prescott, Marshfield, MA (US); Justin Scott Shriver, Newton, MA (US); Frederick Wilson Wheeler, Niskayuna, NY (US)

(73) Assignee: Dresser, Inc., Addison, TX (US)

( * ) Notice: Subject to any disclaimer, the term of this patent is extended or adjusted under 35 U.S.C. 154(b) by 461 days.

(21) Appl. No.: 14/505,108

(22) Filed: Oct. 2, 2014

(65) Prior Publication Data

US 2015/0285397 A1 Oct. 8, 2015

Related U.S. Application Data

(60) Provisional application No. 61/976,297, filed on Apr. 7, 2014.

(51) Int. Cl.
*F16K 37/00* (2006.01)

(52) U.S. Cl.
CPC ...... *F16K 37/0041* (2013.01); *F16K 37/0083* (2013.01); *Y10T 137/8225* (2015.04)

(58) Field of Classification Search
CPC .................................................. F16K 37/0083
See application file for complete search history.

(56) References Cited

U.S. PATENT DOCUMENTS

| | | | |
|---|---|---|---|
| 6,564,167 B2 | 5/2003 | Schifferl | |
| 7,089,086 B2 | 8/2006 | Schoonover | |
| 8,417,468 B2 | 4/2013 | Wilke | |
| 2007/0068225 A1 | 3/2007 | Brown | |
| 2011/0056572 A1 | 3/2011 | Flanders | |
| 2012/0221295 A2 | 8/2012 | Flanders | |
| 2013/0019683 A1 | 1/2013 | Carder et al. | |
| 2013/0153036 A1* | 6/2013 | Young | F16K 37/0033 137/1 |
| 2013/0211735 A1 | 8/2013 | Anderson | |
| 2013/0289940 A1 | 10/2013 | Ams et al. | |
| 2014/0076061 A1 | 3/2014 | Anderson et al. | |

OTHER PUBLICATIONS

International Search Report and Written Opinion issued in connection with corresponding PCT Application No. PCT/US2015/015317 dated Jun. 2, 2015.

* cited by examiner

*Primary Examiner* — Bryan Bui
(74) *Attorney, Agent, or Firm* — Paul Frank + Collins P.C.

(57) ABSTRACT

A method to detect cycling of components that result from use of a tight shut-off mode on a valve assembly. Embodiments of the method use operating data from the valve assembly. This operating data includes data that reflects a position for the closure member relative to the seat. This position often corresponds with a measured position of one or more components (e.g., the valve stem) on the valve assembly. In one embodiment, the method includes steps for comparing the measured position to a boundary criteria that defines one or more boundary values proximate, and often equal to, the threshold levels of the tight shut-off mode. The method can also includes steps for identifying patterns in the data that indicate that the closure member is cycling from its closed position to a second position due to tight shut-off mode.

20 Claims, 8 Drawing Sheets

METHOD FOR DETECTING AN OPERATING CONDITION ON A VALVE ASSEMBLY AND IMPLEMENTATION THEREOF

CROSS-REFERENCE TO RELATED APPLICATIONS

This application claims the benefit of U.S. Provisional Application Ser. No. 61/976,297, filed on Apr. 7, 2014, and entitled "DETECTION OF OPERATING CONDITION IN PROCESS DEVICES," the content of which is incorporated by reference herein in its entirety.

BACKGROUND

The subject matter disclosed herein relates to improvements in flow controls and valve technology, with particular discussion about methods to detect cycling of a valve assembly onset by use of a tight shut-off mode that automatically closes the valve assembly.

Process lines may include many varieties of flow controls. These process lines typically transfer fluids for use in the chemical industry, refining industry, oil & gas recovery industry, and the like. Examples of the flow controls include pneumatic and electronic valve assemblies (collectively, "valve assemblies") that regulate a flow of process fluid (e.g., gas and liquid). In conventional implementation, these valve assemblies have a number of components that work together to regulate flow of process fluid into and/or out of the process line. These components include a closure member, a seat, a valve stem, and an actuator. Examples of the closure member may embody a plug, ball, butterfly valve, and/or like implement that can contact the seat to prevent flow. In common construction, the actuator couples with the closure member (via the valve stem). The valve assembly may also incorporate a valve positioner with electrical and/or electro-pneumatic components. During operation, the valve positioner receives control signals from a controller that is part of a process control system (also "distributed control system" or "DCS"). These control signals define operating parameters for the valve assembly, namely, a position for the closure member relative to the seat. In response to the control signal, the valve positioner delivers a pneumatic signal that regulates instrument gas to pressurize the actuator in order to regulate this position.

Problems with the valve assemblies on the process line may disrupt the process and/or prevent the process line from operating in accordance with necessary process parameters. The resulting disruptions can lower yields and reduce quality. In large refineries, chemical plants, and power plants, disruptions can also lead to significant expense from process downtime to troubleshoot and repair the problematic devices. Plant operators therefore have an interest to prevent problems at the device-level before such problems manifest in ways that can hinder operation of the process line.

Designers and manufacturers of valve assemblies and related devices utilize various solutions that are meant to avoid these problems on the valve assemblies. These solutions may instruct operation of the valve assembly in a certain manner (or "mode") in response to conditions on the device, process line, or process control system in general. One mode is known as tight shut-off. In this mode, the valve positioner attempts to move the valve to a closed position in response to all commanded positions that are below a certain threshold. For example, if the threshold for tight shut-off is 10%, then the valve positioner will attempt to close the valve for commanded positions below 10% and operate as normal for commanded positions above 10%. The tight shut-off mode is useful to prevent operating conditions that arise with the closure member in close proximity to the seat. These operating conditions cause the working fluid to flow at high flow rates and/or velocity. Flow that exhibits these flow parameters can cause wear and/or damage to the valve assembly that can degrade performance and life span of the device.

Unfortunately, use of the tight shut-off mode may inadvertently cause the valve assembly to enter the closed position. This problem may arise because of errors in calibration and/or other manufacturing tolerances that inaccurately characterize the relationship between the measured position and the actual (or "real") position of the closure member relative to the seat. These errors may indicate that the closure member is closer to the seat than it actually is and, thus, any command signals that instruct a position for the closure member that is very near, but not within, the threshold levels can inadvertently trigger the tight shut-off mode. In certain circumstances, the process control system will continue to deliver command signals that cause the valve assembly to repeatedly cycle into and out of the closed position because the process control system is often not "aware" that the valve assembly is configured to implement the tight shut-off mode.

BRIEF DESCRIPTION OF THE INVENTION

This disclosure describes improvements that are useful to detect cycling that results from use of the tight shut-off mode on a valve assembly. These improvements embody a method that uses operating data from the valve assembly. This operating data includes data that reflects a position for the closure member relative to the seat. This position often corresponds with a measured position of one or more components (e.g., the valve stem) on the valve assembly. In one embodiment, the method includes steps for comparing the measured position to a boundary criteria that defines one or more boundary values proximate, and often equal to, the threshold levels of the tight shut-off mode. The method can also include steps for identifying patterns in the data that indicate that the closure member is cycling, e.g., from its closed position due to tight shut-off mode.

BRIEF DESCRIPTION OF THE DRAWINGS

Reference is now made briefly to the accompanying drawings, in which.

Where applicable like reference characters designate identical or corresponding components and units throughout the several views, which are not to scale unless otherwise indicated.

DETAILED DESCRIPTION

The discussion below describes various embodiments of a method for processing operating data for a valve assembly to detect patterns that relate to use of tight shut-off mode. The valve assembly can embody devices found in many process control systems that manage operation of a process line. Examples of the process line can transport materials (e.g., process fluids) typical of the chemical industry, refining industry, and resource extraction industry, to name a few.

As noted above, it is common that the process control system is not "aware" that the valve assembly (or, valve assemblies) on the process line are configured for use of the tight shut-off mode. An examination of these systems shows that this limitation can cause the valve assembly to cycle, a situation in which a component, typically the valve stem, moves continuously between two positions. This problem can arise as the process control system blindly commands the device to move to a position that the valve positioner recognizes as not available because of the tight shut-off mode. The embodiments below can fill this "knowledge" gap in the process control system, typically as an alert to an end user (e.g., process operator or owner) that the operating data indicates the components on the device are cycling at and/or near the threshold levels in place to trigger the tight shut-off mode.

Figure 1:
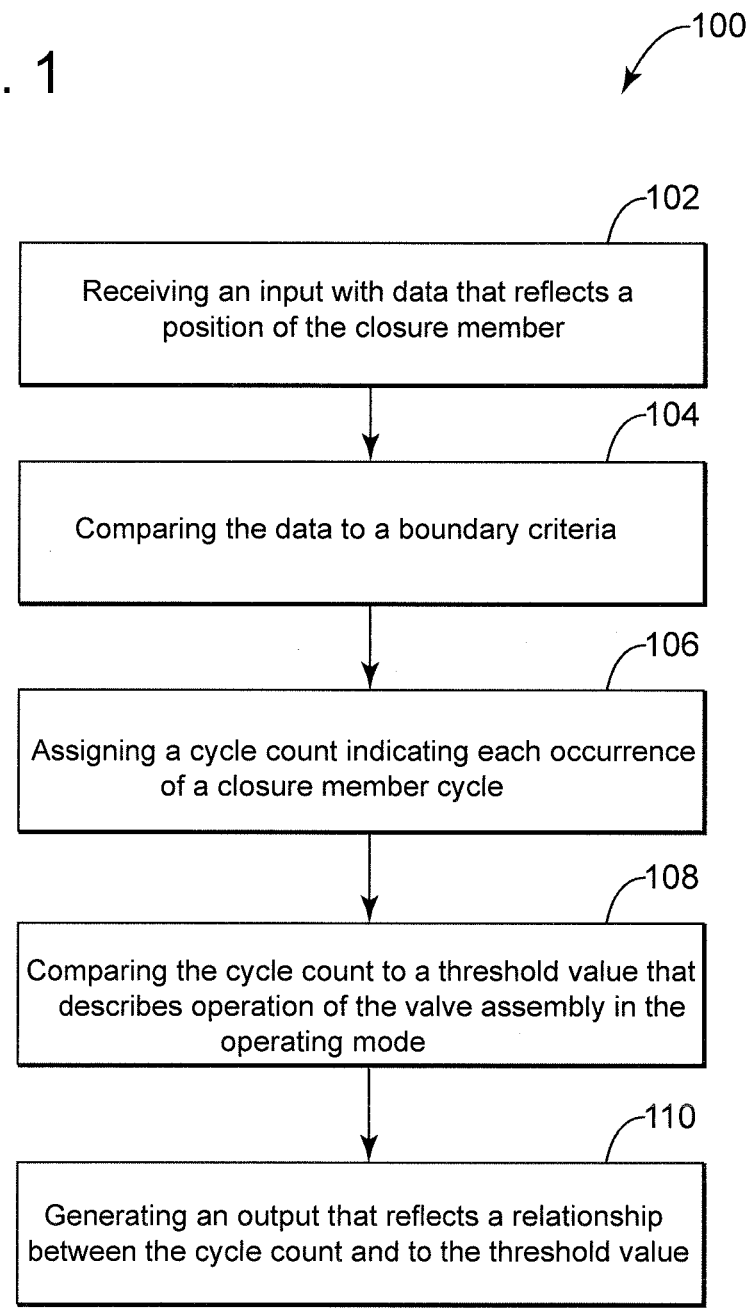
FIG. 1 depicts a flow diagram of an exemplary embodiment of a method for detecting cycling of a closure member onset by use of an operating mode.

FIG. 1 depicts a flow diagram of an exemplary embodiment of a method 100 with steps to process data to recognize use of the tight shut-off mode. As shown in FIG. 1, the method 100 includes, at step 102, receiving an input with data that reflects a position for the closure member and, at step 104, comparing the data to a boundary criteria. The method 100 also includes, at step 106, assigning a cycle count indicating each occurrence of a closure member cycle and, at step 108, comparing the cycle count to a threshold value that describes operation of the valve assembly in the operating mode. The method 100 further includes, at step 110, generating an output with data that reflects a relationship between the cycle count and the threshold value.

At a high level, the method 100 offers a novel approach to process data to recognize the use of tight shut-off mode on the valve assembly. This approach identifies patterns that correspond with symptoms of operation in which control dynamics cause the process control system to continue to issue command signals. These dynamics cycle the measured position for the valve stem at, near, or proximate the threshold levels. Such operation often occurs because the process control system operates largely unaware that the valve assembly is configured to operate in the tight shut-off mode. The embodiments can configure the valve assembly and/or the process control system, generally, to provide an assessment of the operation of the valve assembly, either on-demand and/or in real-time, as desired.

Figure 2:
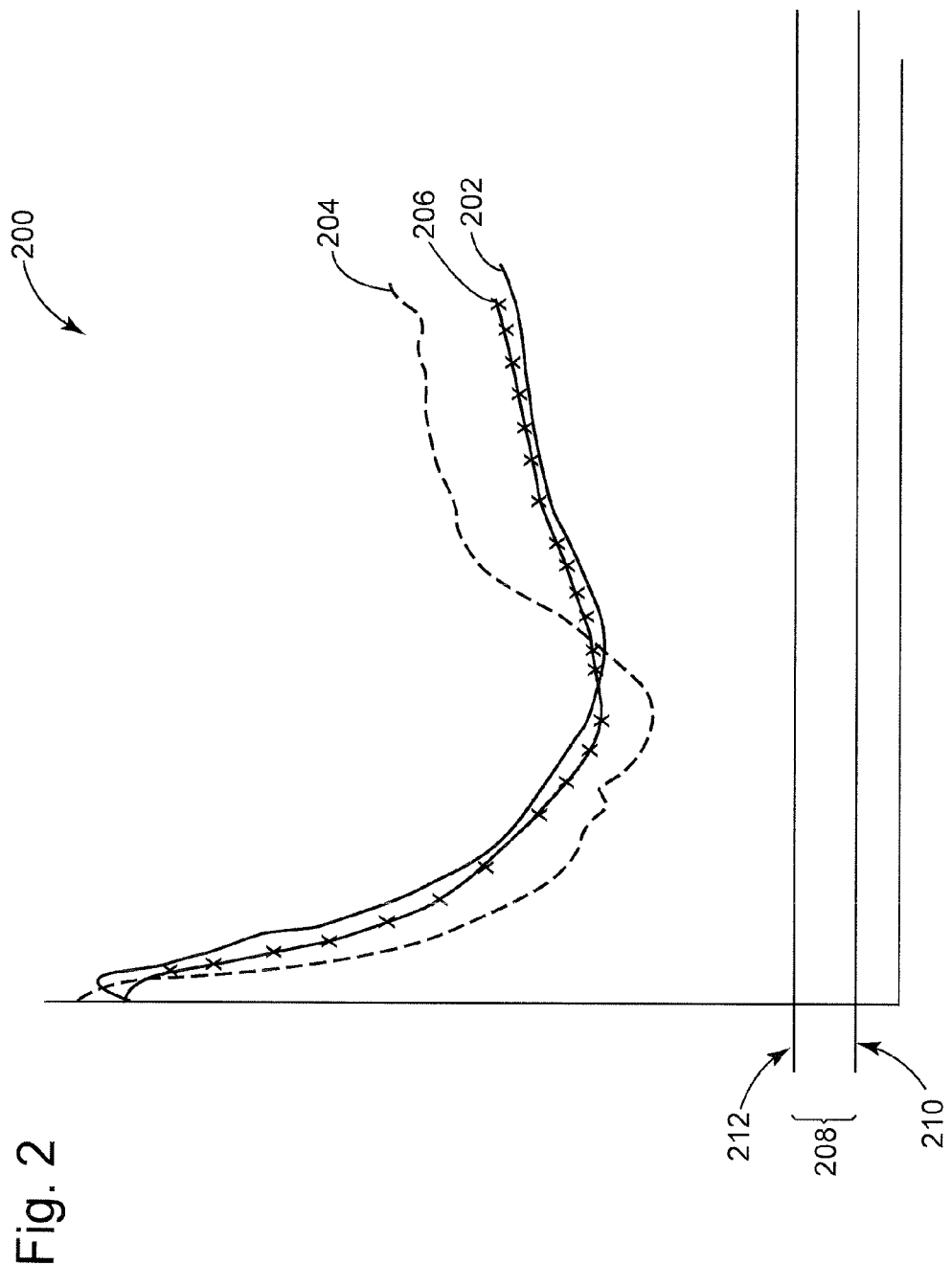
FIG. 2 depicts a plot of data that exemplifies normal operation of an exemplary embodiment of a valve assembly.
Figure 3:
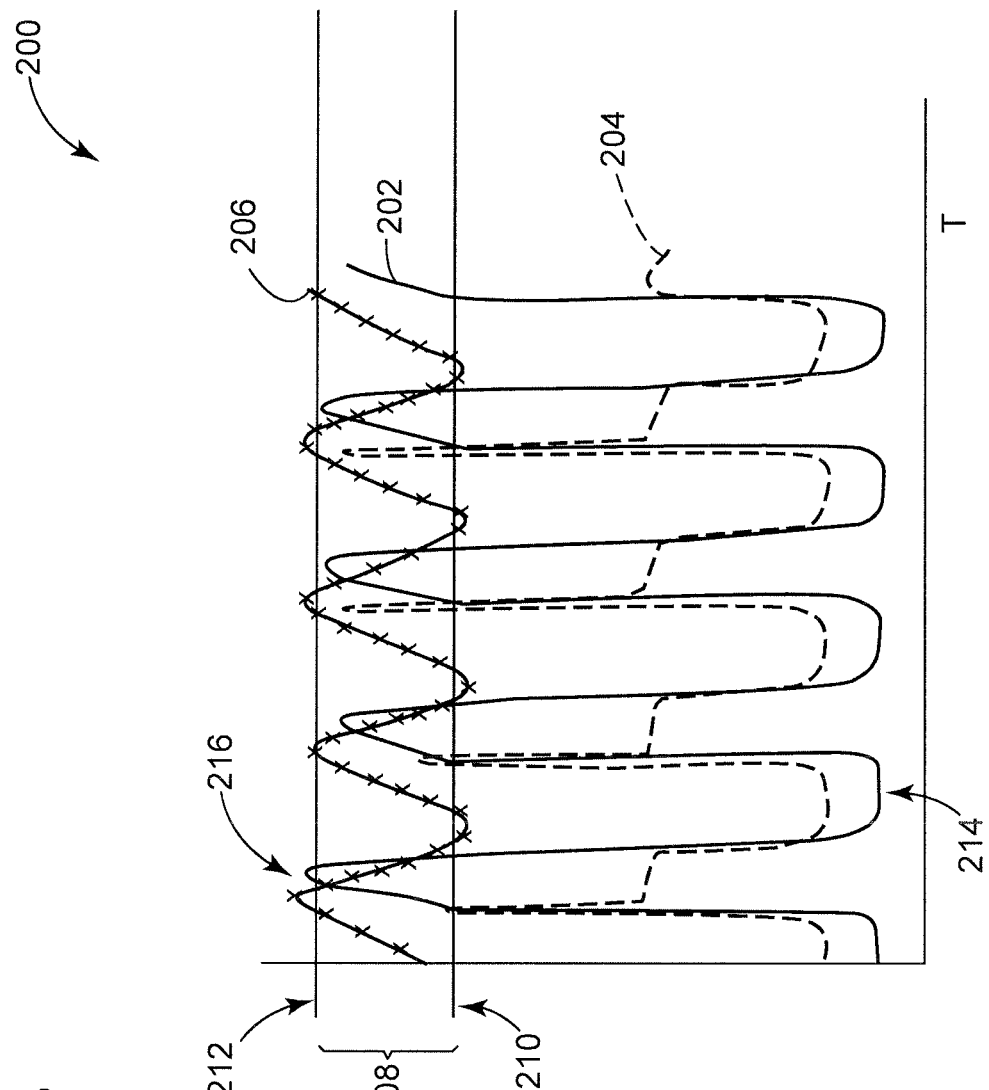
FIG. 3 depicts a plot of data that exemplifies operation of the valve assembly with the closure member cycling relative to the seat.

FIGS. 2 and 3 illustrate diagrams with a plot 200 that is exemplary of the operation of a valve assembly. The data of plot 200 corresponds with operating parameters for the valve assembly, namely, position 202, pressure 204, and setpoint 206, each collected over a time scale T. The diagrams also identify a tight-shut off criteria 208 that comprises one or more tight-shut off thresholds (e.g., a first tight shut-off threshold 210 and a second tight shut-off threshold 212). The setpoint 206 identifies the commanded positions that the process control system issues to the valve assembly. During operation, the valve positioner receives these commanded positions and, in turn, regulates the pneumatic signal to modulate the position of the closure member relative to the seat, as identified by the position 202.

In the plot of FIG. 2, the position 202 exhibits a first pattern that corresponds with stable (or "regular") movement of the closure member relative to the seat. This first pattern is indicative of normal operation of the valve assembly, i.e., that the valve positioner is operating the actuator in response to commanded positions (as indicated by setpoint 206) that are above the tight-shut off thresholds 210, 212. On the other hand, in FIG. 3, the plot 200 of the position 202 exhibits a second pattern that corresponds with cycling of the valve stem among several positions (e.g., a first position 214 and a second position 216) because the setpoint 206 is moving above and below the thresholds 210, 212 of the tight shut-off criteria 208. This operation may occur because the process control system that issues the commanded positions is not aware that the valve positioner has implemented the tight shut-off criteria 208. For purposes of discussion, the first position 214 may identify a minimum or "low" position observed in the data. This minimum position may correspond with the closed position at which the closure member contacts the seat to prevent flow of process fluid. The second position 216 may identify a maximum or "high" position in the data, for example, an open position that is spaced apart from the first position 214.

Referring also to FIG. 1, the step of receiving the input (e.g., at step 102) obtains data indicative of the position of a component (e.g., the closure member, the valve stem, etc.) and/or other operative characteristics of the valve assembly. This data may correspond with operating parameters of the valve assembly. Data for the operating parameters is readily available and collected by the valve positioner, the process control system, and/or other components, as desired. This disclosure does contemplate, however, that the method 100 may use other data that indicates the position of the valve stem and/or the closure member, as well as operation of the valve assembly in the tight shut-off mode; for example, the data may correspond with properties (e.g., pressure) of the instrument gas. In one aspect, the method 100 uses data that corresponds with the measured position of the valve stem on the valve assembly. As an improvement on conventional techniques, the method 100 identifies patterns in this data that indicate adverse operation of the valve assembly, namely, patterns that identify repeated movements, or cycling, of the valve stem that result from use of the tight shut-off mode.

The method 100 may include one or more steps for determining one or both of the positions 214, 216. In the simplest form, these steps may include one or more steps for receiving the minimum position from an end user (e.g., via entry on a user interface) and/or obtaining the minimum position from a storage location (e.g., a data table). These steps may also include one or more steps for processing the data to look for trends, patterns, and/or other indicators that can associate the minimum position with data indicating that the valve assembly is operating at and/or proximate the closed position. In one embodiment, the method 100 may include one or more steps for determining a value for the minimum position that corresponds with a smallest value in the second pattern and assigning the first boundary value and the second boundary value relative to this minimum position. In addition to the data of the plot 200 ("contemporaneous data"), the method 100 may process previously-stored or "historical" data, i.e., data that was collected and/or stored at a time period that occurred prior to the time period for the contemporaneous data of FIGS. 2 and 3. Use of this "historical" data can avoid mischaracterizing certain patterns in the contemporaneous data that appear to identify the minimum position, but are instead merely the result of anomalous behavior of the valve assembly. Such anomalous behavior will often resolve itself (either alone or through intervention by the process operation and/or the process control system, as necessary). The larger compilation of data can also avoid errors in calibration and/or other operational issues that will skew the minimum position away from the closed position, e.g. away from 0%. In one example, the method 100 may include steps for applying a reduction factor or percentage to the minimum position observed in the data. This reduction factor will assign a value to the minimum position that is, effectively, more reasonably related to calibration issues. For example, if initial processing of data (e.g., contemporaneous data, historical data, and/or combinations thereof) identifies a value for the minimum position of 42%, the method 100 may include steps for recognizing that this value is not reasonable for calibration errors and steps for determining that the minimum position should have a value of 5%, which is more reasonable for operation of the valve assembly proximate the closed position.

Figure 4:
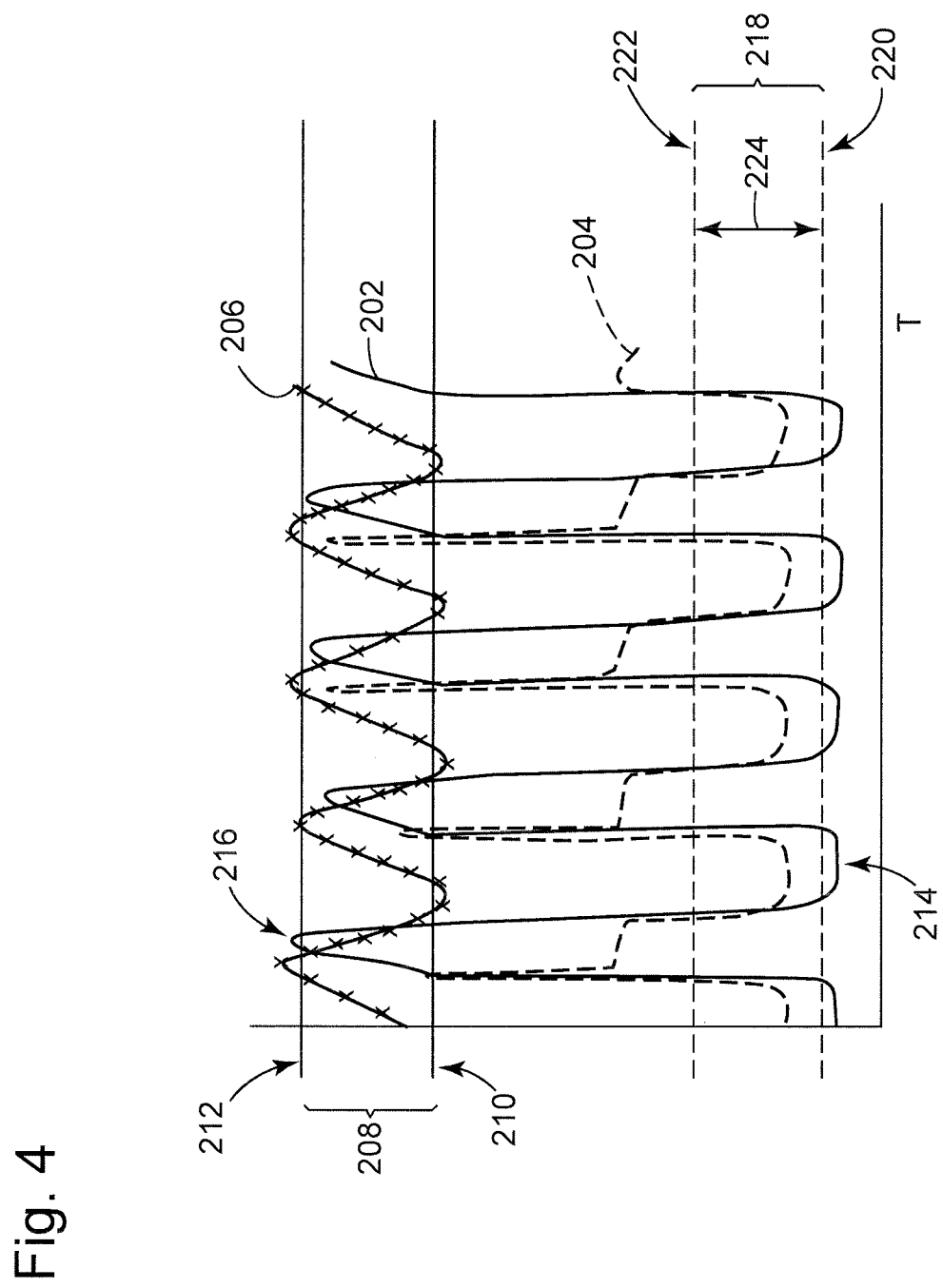
FIG. 4 depicts a plot of data with threshold values that are useful to indicate operation of the valve assembly with the closure member cycling relative to the seat.

The step of comparing the data to a boundary criteria (e.g., at step 104) is useful to identify the second pattern in which the position 202 cycles between the positions 214, 216. To aid in visualizing these steps, FIG. 4 depicts a diagram of the plot 200 that includes a boundary criteria 218. In one example, the boundary criteria 218 establishes a pair of boundary values (e.g., a first boundary value 220 and a second boundary value 222), separated from one another by a boundary interval 224. In one embodiment, the boundary interval 224 is zero, e.g., the boundary values 220, 222 are the same and/or have the same value. It may be helpful that the boundary interval 224 is greater than zero, however, so that the boundary values 220, 222 are spaced away from each other to avoid mischaracterizing movement in the position 202 that might be the result of jitter and/or vibrations, and not cycling, as noted more below in connection with step 106 of the method 100.

The method 100 uses the boundary values 220, 222 to correlate the patterns in the data with use of the tight shut-off mode on the valve assembly. The boundary values 220, 222 may deviate from the values of the tight shut-off thresholds 210, 212. As shown in FIG. 4, for example, one or both of the boundary values 220, 222 are less than the tight shut-off thresholds 210, 212. This feature ensures that the data is indicative of movement that is related to the tight shut-off mode. However, this disclosure does contemplate embodiments of the method 100 in which the values of the boundary values 220, 222 are the same as the values for the tight shut-off threshold 210, 212.

The method 100 may include one or more steps for assigning the boundary values 220, 222. Broadly, the first boundary value and the second boundary value can be proximate, but larger than, the value for a closed position at which the closure member is in contact with the seat. These steps may use the minimum position identified above (and/or another position or value, as desired). In the example of FIG. 4, the boundary values 220, 222 are greater than the minimum position 214. The method 100 may include one or more steps for applying a factor that can define a relative value that modifies (e.g., adds, subtracts, multiplies, divides, etc.) the minimum position to arrive at the boundary values 220, 222. This factor may include a first factor (e.g., 0.25%) and a second factor (e.g., 0.75%), one each to arrive at the first boundary value 220 and a second boundary value 222, respectively, and as noted in Equations (1) and (2) below, $$BL_1 = M_T + R_1, \quad \text{Equation (1)}$$

$$BL_2 = M_T + R_2, \quad \text{Equation (2)}$$

wherein $BL_1$ is the value for the first boundary value, $BL_2$ is the value for the second boundary value, $M_T$ is the value for the minimum position, $R_1$ is a first factor, and $R_2$ is a second factor. In one example, the first factor is different from the second factor, e.g., the first factor is smaller than the second factor. Thus, if the value for the minimum position $M_T$ is 0%, then the value for the first boundary value is set at 0.25% for a first factor of 0.25 and the value for the second boundary value is set at 0.75% for a second factor of 0.75. In one embodiment, the method 100 may utilize the boundary interval 224 to define a relative spacing between the boundary values 220, 222, as shown in Equation (3) below, $$BL_2 = BL_1 + B_1, \quad \text{Equation (3)}$$

wherein $BL_2$ is the second boundary value, $BL_1$ is the first boundary value, and $B_1$ is the boundary interval. By way of the example above, the value for the boundary interval can be 0.5% (e.g., the delta of 0.75-0.25), although the range can vary as desired.

Figure 5:
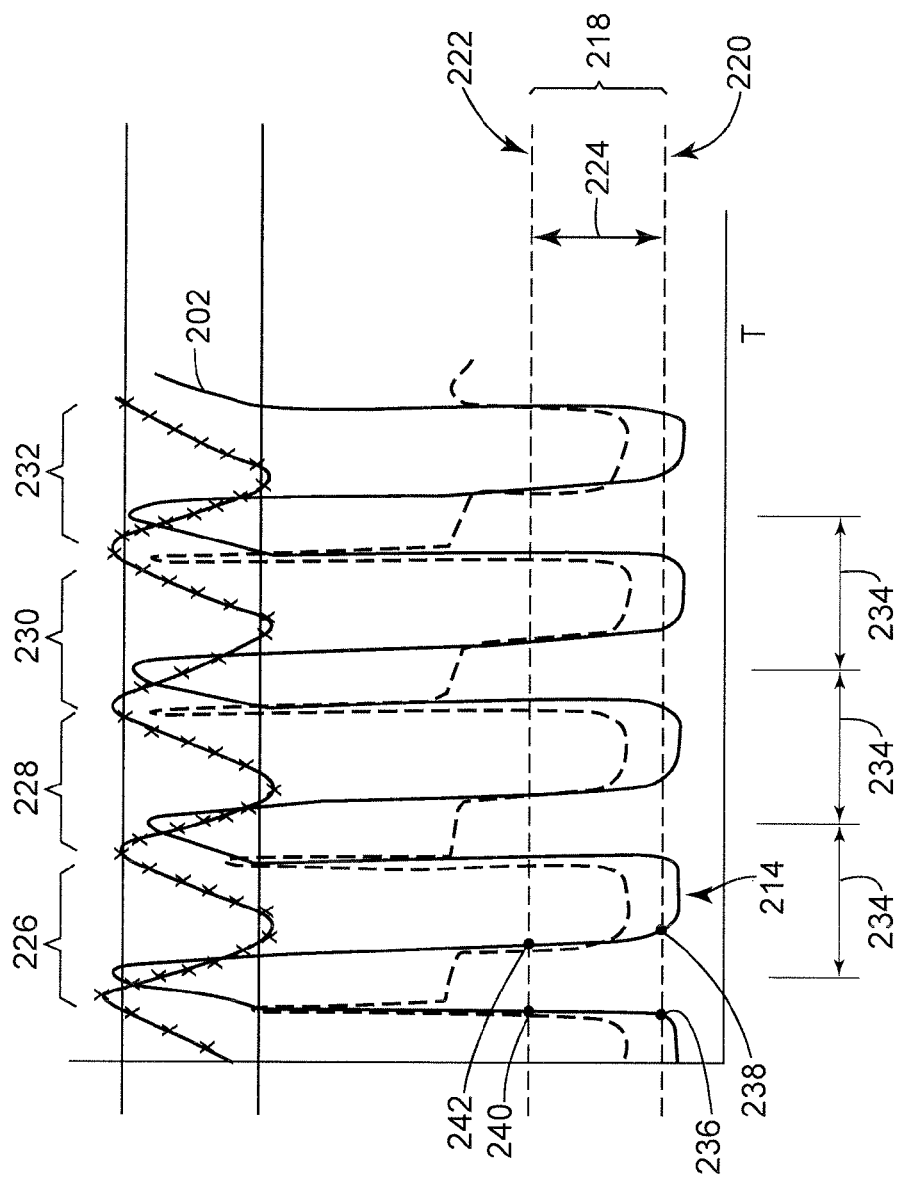
FIG. 5 depicts a plot of data that identifies one or more data samples in the data that are indicative of operation of the valve assembly with the closure member cycling relative to the seat.

The step of assigning a cycle count indicating each occurrence of a closure member cycle (e.g., at step 106) uses the boundary criteria 218 to identify features of the data that are indicative of cycling of the valve stem on the valve assembly. FIG. 5 depicts a diagram of the plot 200 that identifies one or more cycles (e.g., a first cycle 226, a second cycle 228, a third cycle 230, and a fourth cycle 232) in the position 202. The cycles are spaced apart from one another by a cycle interval 234. Each of the cycles 226, 228, 230, 232 includes one or more data samples, shown here as one or more lower data samples (e.g., a first lower data sample 236 and a second lower data sample 238) and/or one or more upper data samples (e.g., a first upper data sample 240 and a second upper data sample 242).

The method 100 can include steps for comparing the data to each of the boundary values 220, 222. At a high level, the method 100 can include steps for incrementing the cycle count each time the pattern in the data of the position 202 changes (e.g., in either direction) from a first value to a second value that is separated from the first value by at least the boundary interval. The method 100 may also increment the cycle count when the data of the position 202 assumes, e.g., sequentially and/or chronologically, values that are equal to or greater than the first boundary value 220 (e.g., at point 236) then the second boundary value 222 (e.g., at point 240), or equal to or less than the second boundary 222 (e.g., at point 242) then the first boundary 220 (e.g., at point 238). These steps will arrive at a total number of half-cycles. The method 100 may also include one or more steps for determining a total of number cycles, which may include one or more steps for applying a cycle reduction factor, for example, dividing the cycle count by two and/or otherwise reducing the cycle count by one-half. These steps take into consideration that each cycle (e.g., closure member cycles 226, 228, 230, 232) will include "travel" of the valve stem toward and away from the minimum position (e.g., the first position 214). This disclosure contemplates other steps for the method 100 that utilize the data of the position 202 to arrive at the cycle count including other combinations of the lower data samples 236, 238 and the upper data samples 240, 242.

The step of comparing the cycle count to a pattern value (e.g., at step 108) is useful to identify a pattern, if any, in the data of the position 202. The pattern value may define a particular number of occurrences of the closure member cycles (e.g., 5) and/or frequency of occurrences of the closure member cycle (e.g., 5/100 sec) that is determinative of cycling of the valve assembly due to use of the tight shut-off mode. In one embodiment, the method 100 may include one or more steps for receiving and/or retrieving the pattern value. These steps may include steps for soliciting the pattern value from the end user via the user interface. This feature affords the end user with the ability to set and/or tune the method 100 for each particular valve assembly, thus providing a robust platform to assess operation of the valve assembly to observe and identify potential cycling problems due to use of the tight shut-off mode, as desired. In one embodiment, the method 100 can include one or more steps for comparing the cycle count to the pattern value, wherein the output reflects a relationship between the cycle count and the pattern value.

The step of generating an output (e.g., at step 110) can provide an indication of the operation of the valve assembly. This indication may alert the end user of the status of the valve assembly, particularly with respect to the presence of tight shut-off mode and also the problems with cycling of the closure member relative to the seat that may be caused by use of the tight shut-off mode. Examples of the indication may embody an audible sound, visual indicator on the user interface, and/or other electronic and/or non-electronic means to draw attention to the operation of the valve assembly. During operation, the indication may depend on the relationship between the occurrences and the pattern value. This relationship can embody a relative position of the occurrences relative to the pattern threshold value. For example, the occurrences may be less than, greater than, and/or equal to, the pattern value. In one embodiment, the indication will provide the alert in response to the occurrences of the closure member cycle being greater than and/or equal to the pattern value.

Figure 6:
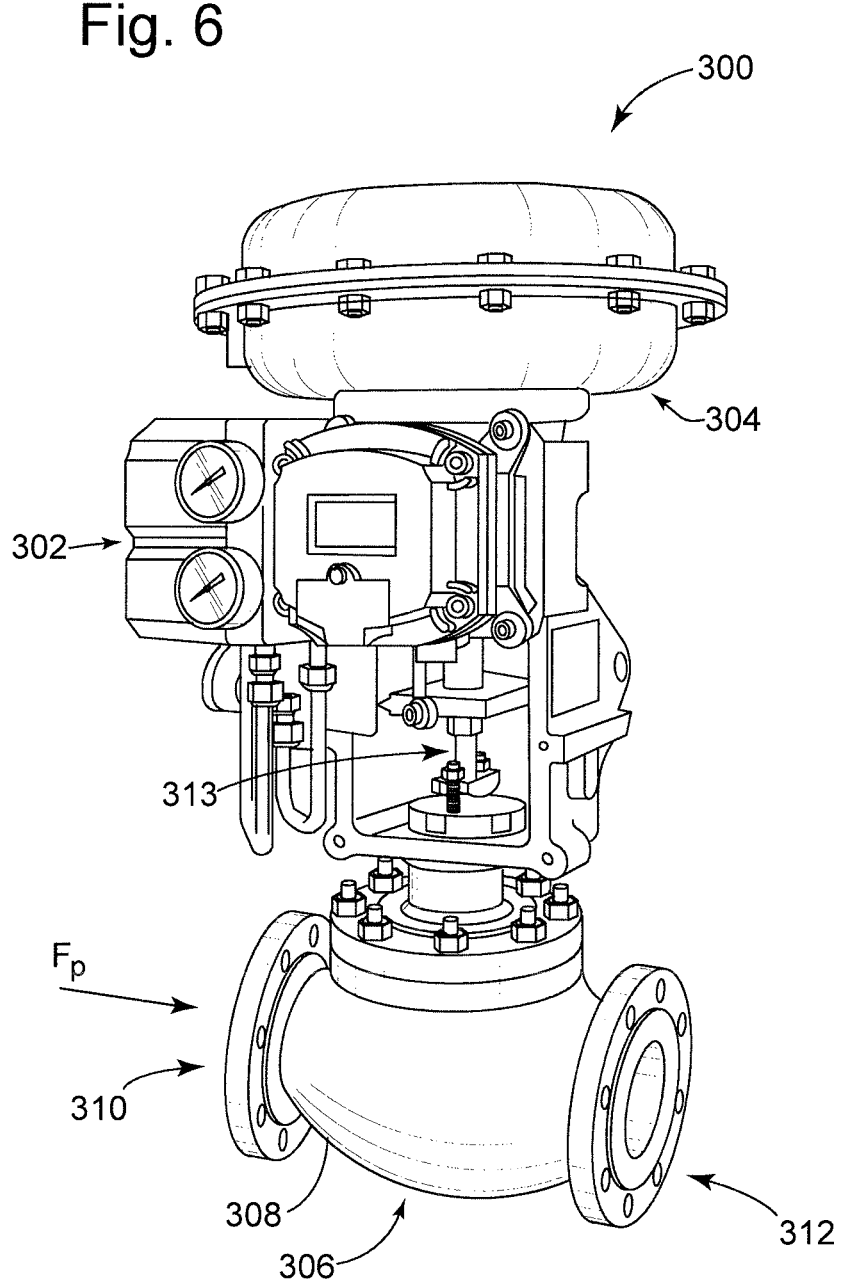
FIG. 6 depicts a perspective view of an example of a valve assembly that can implement the operating mode to avoid damage often associated with positions for the closure member close to the seat.
Figure 7:
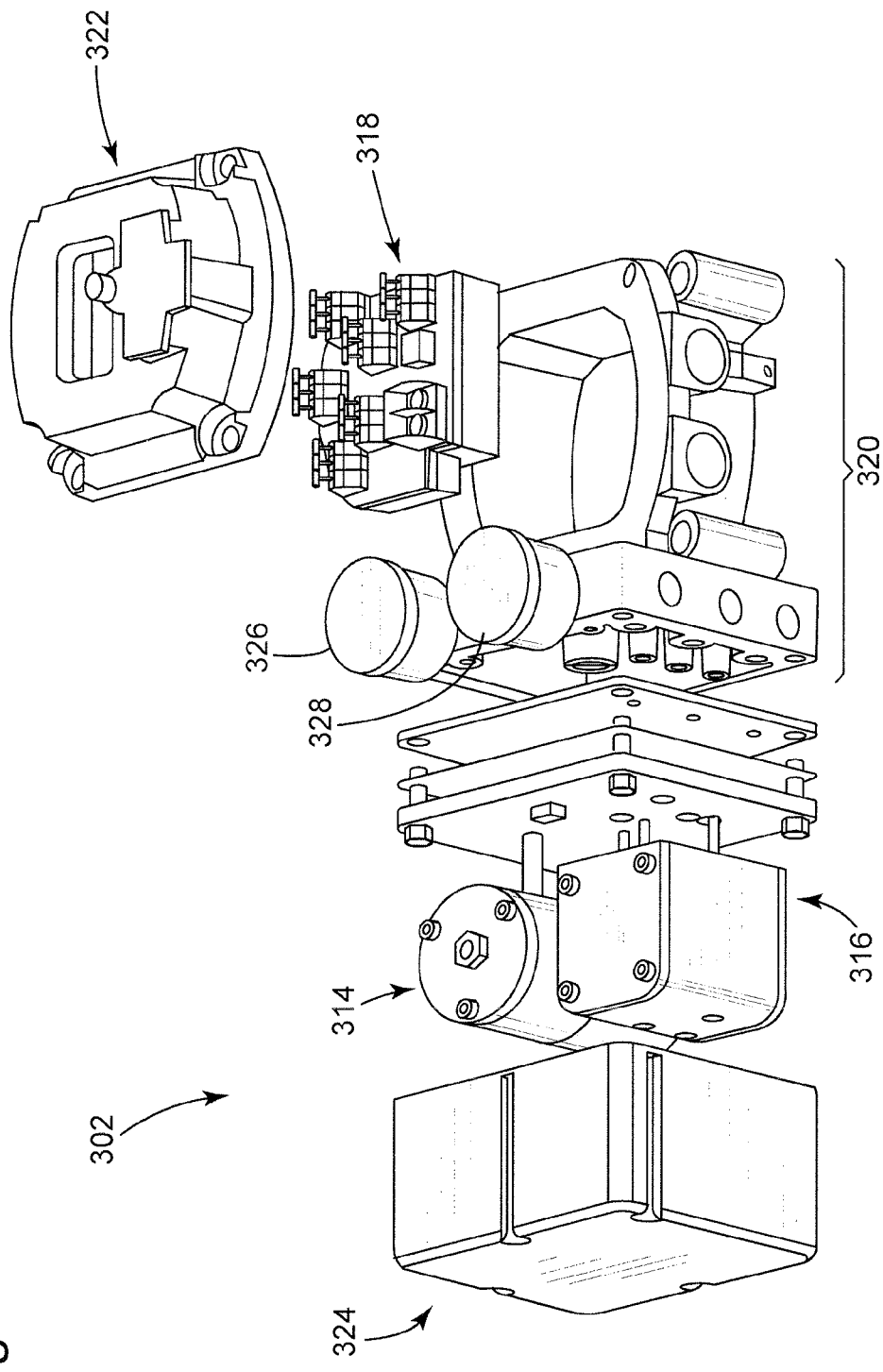
FIG. 7 depicts a perspective, exploded view of the valve positioner.
Figure 8:
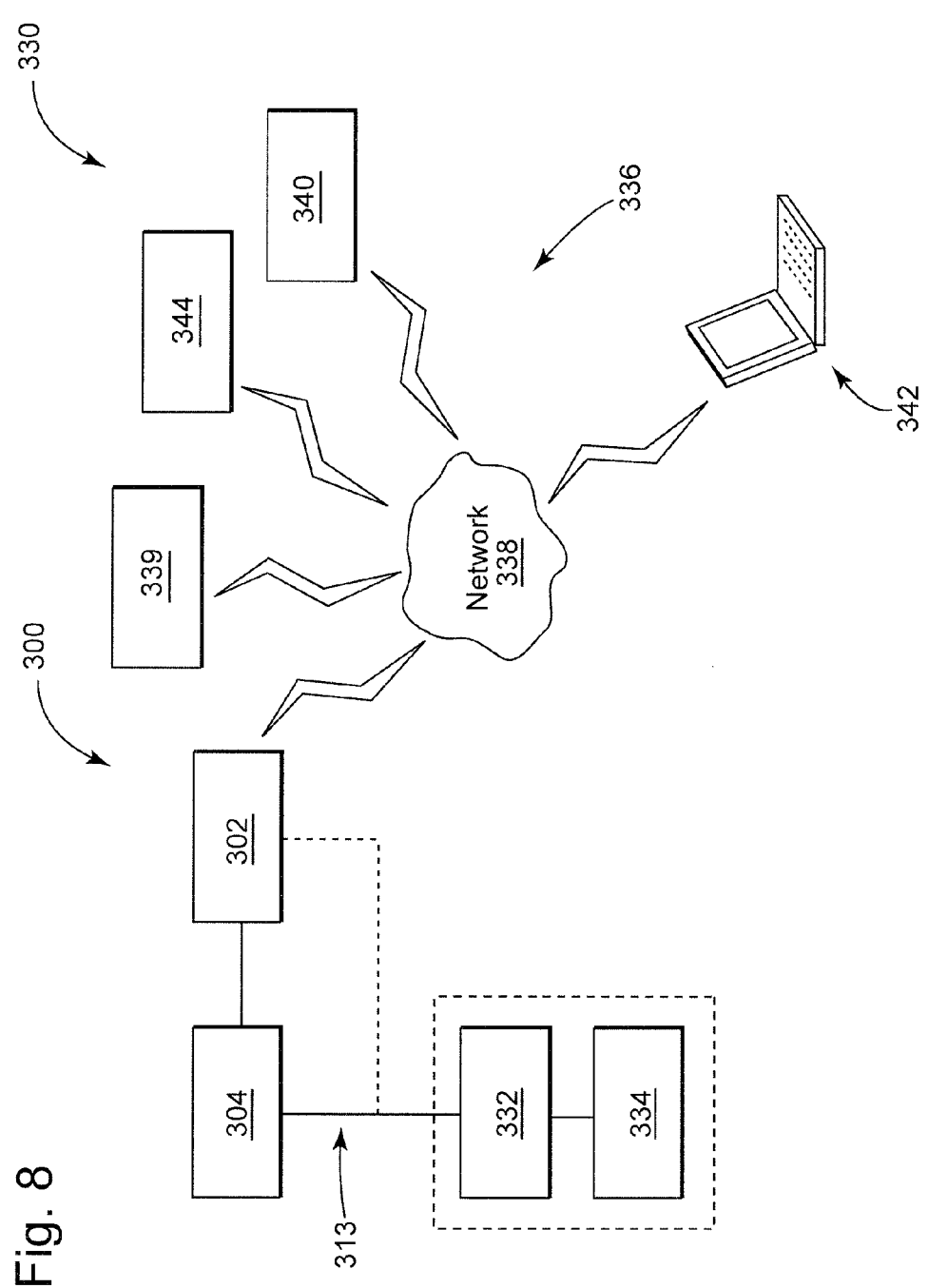
FIG. 8 depicts a schematic diagram of an exemplary embodiment of a valve assembly as part of a process control system.

The discussion now turns to the devices and systems that may implement the method 100. FIGS. 6, 7, and 8 provide examples of a valve assembly (FIGS. 6, 7, and 8) and a process control system (FIG. 8). FIG. 6 shows a perspective view of an example of a valve assembly 300. FIG. 7 provides an exploded assembly view of a component (e.g., a valve positioner) of the valve assembly 300. FIG. 8 depicts a schematic diagram of an example of the valve assembly 300 as part of a process control system.

In FIG. 6, the valve assembly 300 includes a valve positioner 302, an actuator 304, and a fluid coupling 306 with a body 308 that has a first inlet/outlet 310 and a second inlet/outlet 312. The valve assembly 300 has a valve stem 313, which couples the actuator 304 with, e.g., a closure member, that is found in the interior to the body 808 and, thus, not shown in the present view. This structure can modulate a flow of process fluid $F_P$ between the inlet/outlets 310, 312. During operation, the valve positioner 302 regulates instrument gas (also, "pneumatic signal") into the actuator 306 to manage the position of the valve members disposed in the body 308. The change in position modulates flow of the process fluid $F_P$ across the inlet/outlets 310, 312.

FIG. 7 depicts the valve positioner 302 in exploded form. As noted above, the valve positioner 302 has components that generate a pneumatic signal to the actuator 304 (FIG. 6). The valve positioner 302 can have a plurality of positioner components (e.g., a converter component 314, a relay component 316, a processing component 318). The valve positioner 302 can also have a housing 320. One or more covers (e.g., a first cover 322 and a second cover 324) can secure with the housing 320 to form an enclosure about the positioner components 314, 316, 318. This enclosure protects the positioner components from conditions that prevail in the environment surrounding the valve assembly 300. The valve positioner 302 also includes one or more gauges (e.g., a first gauge 326 and a second gauge 328) that can provide an indication of the flow conditions (e.g., pressure, flow rate, etc.) of the instrument gas that the valve positioner 302 uses to operate the valve in the valve assembly 300. In one example, operation of the positioner components 316, 318, 320 maintain the position of the valve members in the body 308 (FIG. 6) to modulate flow of the process fluid $F_P$ across the inlet/outlets 310, 312 (FIG. 6).

FIG. 8 depicts a schematic diagram of the valve assembly 300 as part of a process control system 330. The valve members can include a closure member 332 that can move relative to a seat 334. Examples of the closure member may embody a plug, ball, butterfly valve, and/or like implement that can contact the seat to prevent flow. As also shown in FIG. 8, the valve assembly 300 integrates as part of the control system 330, typically by way of communication between the valve positioner 302 and a network system 336 via a network 338. Examples of the network 338 can transfer data, information, and signals by way of wired protocols (e.g., 4-20 mA, Foundation Fieldbus, etc.) and/or wireless protocols, many of which find use in a plant or factory automation environment. These protocols facilitate communication over the network 338 between the valve positioner 302, a process controller 339 (or "DCS 339"), a management system server 340, a terminal 342, and/or an external server 344. During operation, the process controller 339 can execute one or more computer programs to deliver a command signal to the valve positioner 302. The command signals identify the commanded position for the closure member 332. The valve positioner 302 uses the commanded signal to modulate the instrument gas to the actuator 304 and, effectively, allow the closure member 332 to move relative to the seat 334. In one example, feedback in the assembly can provide the valve positioner 302 with a measured position of the valve stem 313. The measured position corresponds with the location and/or position of the closure member 332 relative to the seat 334. The management system server 340 can interface with the valve assembly 300 and/or with the process controller 339 to obtain the data for the measured position and other operating parameters.

The data may reside on a data source, often locally in one or more memories on the valve positioner 302, although this disclosure also contemplates configurations in which the data resides on the process control system 330. For example, the data source may integrate with the process controller 340 and/or as part of the external server 344. At the data source, the data may be arranged as one or more data sets that include one or more data samples. The data sets may be identified by an indicator (e.g., a date stamp, a time stamp, a date/time stamp, etc.) that relates to the chronological time at which the data samples in the data set were gathered and/or stored, e.g., in memory. For real-time use of the method 100, the data samples may be read into a buffer and/or like configured storage medium that allows for ready access to the data samples to afford the method 100 with chronologically relevant data, taking into consideration necessary data processing time-lag. In one embodiment, the method 100 may include one or more steps for obtaining and/or retrieving the data from the data source.

In view of the foregoing, the embodiments above employ features that can detect, and/or facilitate detection of, operating modes and/or conditions on a process device. A technical effect is to identify the cycling of a closure member relative to a seat that can result from use of the tight shut off mode on the valve assembly, which in turn can trigger an alarm or an output, generally, that can indicates the operating condition to avoid damage and/or further problems with the valve assembly.

The embodiments may be implemented on any device where relevant data is present and/or is otherwise accessible. For example, the embodiments can be implemented as executable instructions (e.g., firmware, hardware, etc.) on the valve positioner. The valve positioner can transmit the output of the embodiments to a distributed control system, asset management system, independent monitoring computing device (e.g., a desktop computer, laptop computer, tablet, smartphone, mobile device, etc.). In another embodiment, the embodiments can obtain data from a historian (e.g., a repository, memory, etc.), and send to an independent diagnostic computer device. The historian is conventionally connected to the asset management system or distributed control system. The diagnostic computing device has all the capabilities of the monitoring computer and the additional capability to execute executable instructions for the embodiment to process the given data. In another embodiment, the valve positioner is configured to send data by wires or wirelessly to the diagnostic computing device, as well as through peripheral and complimentary channels (e.g., through intermediate devices such as a DCS or may be connected directly to the diagnostic computer).

One or more of the steps of the methods (e.g., method 100) can be coded as one or more executable instructions (e.g., hardware, firmware, software, software programs, etc.). These executable instructions can be part of a computer-implemented method and/or program, which can be executed by a processor and/or processing device. The processor may be configured to execute these executable instructions, as well as to process inputs and to generate outputs, as set forth herein. For example, the software can run on the process device, the diagnostics server, and/or as software, application, or other aggregation of executable instructions on a separate computer, tablet, laptop, smart phone, wearable device, and like computing device. These devices can display the user interface (also, a "graphical user interface") that allows the end user to interact with the software to view and input information and data as contemplated herein.

The computing components (e.g., memory and processor) can embody hardware that incorporates with other hardware (e.g., circuitry) to form a unitary and/or monolithic unit devised to execute computer programs and/or executable instructions (e.g., in the form of firmware and software). Exemplary circuits of this type include discrete elements such as resistors, transistors, diodes, switches, and capacitors. Examples of a processor include microprocessors and other logic devices such as field programmable gate arrays ("FPGAs") and application specific integrated circuits ("ASICs"). Memory includes volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

Aspects of the present disclosure may be embodied as a system, method, or computer program product. The embodiments may take the form of an entirely hardware embodiment, an entirely software embodiment (including firmware, software, etc.) or an embodiment combining software and hardware aspects that may all generally be referred to herein as a "circuit," "module" or "system." The computer program product may be embodied as one or more non-transitory computer readable medium(s) having computer readable program code embodied thereon.

Computer program code for carrying out operations for aspects of the present invention may be written in any combination of one or more programming languages, including an object oriented programming language and conventional procedural programming languages. Program code embodied on a computer readable medium may be transmitted using any appropriate medium, including but not limited to wireless, wireline, optical fiber cable, RF, etc., or any suitable combination of the foregoing.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for detecting cycling of a closure member relative to a seat on a valve assembly, said method comprising:
receiving an input with data in a pattern that reflects movement of the closure member;
comparing the data to a boundary criteria, the boundary criteria defining a first boundary value and a second boundary value separated by a boundary interval, wherein each of the first boundary value and the second boundary value is proximate, but larger than, a value for a closed position at which the closure member is in contact with the seat, and wherein the first boundary value and the second boundary value are arrived at by,
determining a value for a minimum position that corresponds with a smallest value in the pattern; and
assigning the first boundary value and the second boundary value relative to this minimum position by applying a factor to the minimum position to arrive at the first boundary value and the second boundary value, wherein the factor includes a first factor and a second factor for use with, respectively, the first boundary value and the second boundary value, and wherein the first factor is different from the second factor;

incrementing a cycle count each time the pattern changes from a first value to a second value that is separated from the first value by at least the boundary interval; and generating an output that reflects the cycle count.

2. The method of claim 1, further comprising:
reducing the cycle count by one-half; and
comparing the cycle count to a pattern value that defines a number of closure member cycles, wherein the output reflects a relationship between the cycle count and the pattern value.

3. The method of claim 1, wherein the first boundary value is calculated in accordance with, $$BL_1 = M_T + R_1,$$

wherein $BL_1$ is the first boundary value, $M_T$ is the value for the minimum position, and $R_1$ is the first factor that is selected to space the first boundary value from the minimum position.

4. The method of claim 1, wherein the second boundary value is calculated in accordance with, $$BL_2 = M_T + R_2,$$

wherein $BL_2$ is the second boundary value, $M_T$ is the value for the minimum position, and $R_2$ is the second factor.

5. The method of claim 1, wherein the data corresponds with pressure of incoming instrument gas.

6. The method of claim 1, further comprising:
using historical data to characterize the pattern as non-anomalous behavior.

7. The method of claim 1, further comprising:
comparing the cycle count to a pattern value that defines a number of closure member cycles, wherein the output reflects a relationship between the cycle count and the pattern value.

8. A valve assembly, comprising:
an actuator;
a valve stem coupled with the actuator;
a valve coupled with the valve stem, the valve comprising a closure member and a seat, wherein the closure member is configured to move relative to the seat; and
a valve positioner coupled with the valve assembly, the valve positioner comprising a processor with access to a memory that has one or more executable instructions stored thereon, the executable instructions comprising one or more instructions for,
  receiving an input with data in a pattern that reflects movement of the closure member,
  comparing the data to a boundary criteria, the boundary criteria defining a first boundary value and a second boundary value separated from one another by a boundary interval, wherein each of the first boundary value and the second boundary value is proximate, but larger than, a value for a closed position at which the closure member is in contact with the seat, and wherein the first boundary value and the second boundary value are arrived at by,
    determining a value for a minimum position that corresponds with a smallest value in the pattern; and
    assigning the first boundary value and the second boundary value using this minimum position by applying a factor to the minimum position to arrive at the first boundary value and the second boundary value, wherein the factor includes a first factor and a second factor for use with, respectively, the first boundary value and the second boundary value, and wherein the first factor is different from the second factor;
  incrementing a cycle count each time the pattern changes from a first value to a second value that is separated from the first value by at least the boundary interval; and
  generating an output that reflects the cycle count.

9. The valve assembly of claim 8, wherein the executable instructions include instructions for:
reducing the cycle count by one-half; and
comparing the cycle count to a pattern value that defines a number of closure member cycles, wherein the output reflects a relationship between the cycle count and the pattern value.

10. The valve assembly of claim 8, wherein the executable instructions include instructions for:
assigning the first boundary value in accordance with, $$BL_1 = M_T + R_1,$$

wherein $BL_1$ is the first boundary value, $M_T$ is the value for the minimum position, and $R_1$ is the first factor that is selected to space the first boundary value from the minimum position.

11. The valve assembly of claim 8, wherein the executable instructions include instructions for:
assigning the second boundary value in accordance with, $$BL_2 = M_T + R_2,$$

wherein $BL_2$ is the second boundary value, $M_T$ is the value for the minimum position, and $R_2$ is the second factor.

12. The valve assembly of claim 8, wherein the data corresponds with pressure of incoming instrument gas.

13. The valve assembly of claim 8, wherein the executable instructions include instructions for:
using historical data to characterize the pattern as non-anomalous behavior.

14. The valve assembly of claim 8, wherein the executable instructions include instructions for:
comparing the cycle count to a pattern value that defines a number of closure member cycles, wherein the output reflects a relationship between the cycle count and the pattern value.

15. A valve positioner for use on a valve assembly having a closure member that moves relative to a seat, said valve positioner comprising:
a processor;
a memory coupled with the processor; and
one or more executable instructions stored in the memory and configured to be executed by the processor, the executable instruction comprising one or more instruction for,
  receiving an input with data in a pattern that reflects movement of the closure member,
  comparing the data to a boundary criteria, the boundary criteria defining a first boundary value and a second boundary value separated from one another by a boundary interval, wherein each of the first boundary value and the second boundary value is proximate, but larger than, a value for a closed position at which the closure member is in contact with the seat, and wherein the first boundary value and the second boundary value are arrived at by
  determining a value for a minimum position that corresponds with a smallest value in the pattern; and
  assigning the first boundary value and the second boundary value using the minimum position by applying a factor to the minimum position to arrive at the first boundary value and the second boundary value, wherein the factor includes a first factor and a second factor for use with, respectively, the first boundary value and the second boundary value, and wherein the first factor is different from the second factor;
incrementing a cycle count each time the pattern changes from a first value to a second value that is separated from the first value by at least the boundary interval; and
generating an output that reflects the cycle count.

16. The valve positioner of claim 15, wherein the executable instructions include instructions for:
reducing the cycle count by one-half; and
comparing the cycle count to a pattern value that defines a number of closure member cycles, wherein the output reflects a relationship between the cycle count and the pattern value.

17. The valve positioner of claim 15, wherein the executable instructions include instructions for:
assigning the first boundary value in accordance with,
$$BL_1 = M_T + R_1,$$
wherein $BL_1$ is the first boundary value, $M_T$ is the value for the minimum position, and $R_1$ is the first factor that is selected to space the first boundary value from the minimum position; and
assigning the second boundary value in accordance with,
$$BL_2 = M_T + R_2,$$
wherein $BL_2$ is the second boundary value, $M_T$ is the value for the minimum position, and $R_2$ is the second factor.

18. The valve positioner of claim 15, wherein the data corresponds with pressure of incoming instrument gas.

19. The valve positioner of claim 15, wherein the executable instructions include instructions for:
using historical data to characterize the pattern as non-anomalous behavior.

20. The valve positioner of claim 15, wherein the executable instructions include instructions for:
comparing the cycle count to a pattern value that defines a number of closure member cycles, wherein the output reflects a relationship between the cycle count and the pattern value.

* * * * *